United States Patent Office.

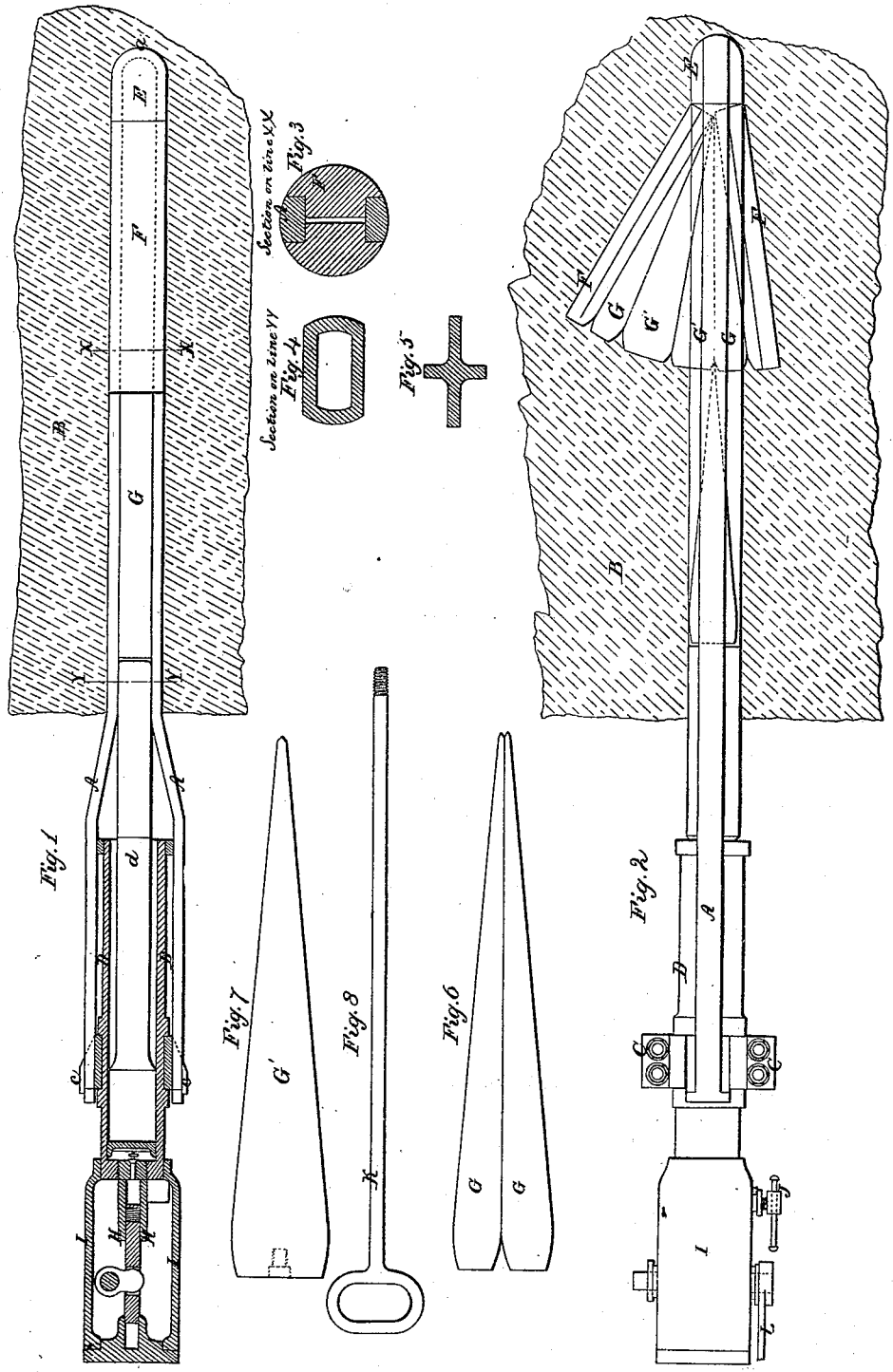

JOHN JONES, OF CHESNUT HOUSE, STRATFORD, AND SAMUEL PARKER BIDDER, JR., OF HILLFIELD MITCHAM, ENGLAND.

Letters Patent No. 94,216, dated August 31, 1869; patented in England, November 17, 1868.

IMPROVED COAL-BREAKING MACHINE.

The Schedule referred to in these Letters Patent and making part of the same.

*To all whom it may concern:*

Be it known that we, JOHN JONES, of Chesnut House, Stratford, in the county of Essex, and SAMUEL PARKER BIDDER, the younger, of Hillfield, Mitcham, in the county of Surrey, England, have invented "an Improved Machine or Apparatus for Breaking Down Coal, Slate, Stone, and other Minerals; and we do hereby declare that the following is a full and exact description of the said invention, reference being had to the accompanying drawing, and to the figures and letters marked thereon; that is to say—

Our invention has reference to apparatus whereby the breaking down of coal, slate, stone, and other minerals is effected by hydraulic or screw-power combined with a wedging-action.

We have found that in breaking down coal and other comparatively soft and yielding minerals, the action of one single wedge, as heretofore proposed, is not sufficient to effect the required purpose.

Now, our present invention consists in breaking down coal, slate, stone, and other minerals, by means of apparatus wherein two or more wedges are caused to be driven consecutively, by hydraulic or screw-power, between the surfaces of the substances to be broken down.

The arrangement of apparatus for this purpose may be variously modified, but by preference we employ apparatus constructed as follows:

Two tension-bars or rods, either formed of two separate pieces or of one looped piece, are inserted into the hole cut in the coal or other substance, the outer ends of which bars are connected to the cylinder of a hydraulic ram or press, or to the framing or screwed-nut or boss, carrying a screw-spindle.

Between the tension-bars, at their innermost end, is placed a clearance-box, and then two metal pressing-blocks, between which is afterwards forced, first, a single wedge, by the action of the ram of the hydraulic press or of the screw-spindle. The ram or screw-spindle is then withdrawn, and a second wedge is inserted, either between the one side of the first wedge and that of one of the pressing-blocks, or the first wedge may be made as a split wedge, and the second wedge be driven between the two parts thereof.

If requisite, a third wedge may in like manner be driven in, and so on, until a sufficient wedging-action is obtained to effect the breaking down of the mass desired to be removed.

The wedges and pressing-blocks may be formed either so as to cause the pressing-blocks, while expanding, to retain at first a position parallel to each other, by making these with inner inclined surfaces, similar to the inclined surfaces of the wedges, or they may be arranged to form from the commencement a gradually-increasing angle with each other.

The wedges can pass beyond the pressing-blocks and into the clearance-box, which thus allows them to impart a greater lateral motion to the pressing-blocks than would be the case were the clearance-box not employed; it may, however, in some cases be dispensed with, when no great lateral motion is required.

The ends of the tension-bars are by preference made detachable from the hydraulic press, for introducing the wedges consecutively.

When the apparatus is worked by hydraulic power, we prefer to construct the hydraulic press with the force-pump formed in one therewith, or fixed directly thereto, and it may be constructed either with a closed receptacle, containing the requisite charge of water for working it, or the water may be supplied, through a suction-pipe, from a separate reservoir.

The advantages resulting from the employment of our improved apparatus, in addition to the absence of the noxious vapors in the mine resulting from the use of blasting-powder, are, firstly, a great saving in the time employed in effecting the breaking down of the coal or other mineral, owing to the almost unlimited power which is available by our system, enabling us to break down at one operation far greater masses than can be effected by blasting, and, secondly, the avoidance of the deterioration of the coal or other mineral resulting from the use of blasting-powder, in consequence of the large quantities of small fragments which are produced thereby.

The arrangement of apparatus we prefer to employ in carrying our invention into practice, is shown on the accompanying sheet of drawings, in which—

Figure 1 shows a sectional elevation of the apparatus;

Figure 2 shows a plan of the same; and

Figures 3 to 8 show enlarged details of the same.

The apparatus consists, first, of the tension-bars A A, which are inserted into the hole cut in the coal or other material B to be broken down, which bars may either be formed of two separate pieces fixed together, or of one single piece bent round into a loop at *a*.

These bars project beyond the face of the material B, where they widen out somewhat, as shown in fig. 1, and are formed with T-heads at their ends, by means of which they are attached to lugs *c c*, fixed by means of a collar, C, to the hydraulic press D, which has a force-pump, H, contained in a closed reservoir of water, I, attached thereto.

Between the tension-bars A are placed, first, the metal clearance-box E, and, secondly, the two metal pressing-blocks F F, of the form shown more clearly in the section at fig. 3, after which the two wedges, or double or split-wedge G G, shown enlarged at fig. 6, are introduced, so that their points enter the small interstice between the pressing-blocks.

The parts A, E, F, and G, thus combined, are then introduced into the hole cut in the material B, and the hydraulic press D is connected to the tension-bars by the T-heads of the latter being made to catch behind the lugs c c of the former.

The ram D of the press (the front part of which may either be of the form shown in the section at fig. 4 or as at fig. 5) is then moved forward by working the pump-handle L, and is then caused to force the double wedge G forward between the two pressing-blocks F, thereby forcing these asunder, the clearance-box E allowing the wedge, if requisite, to be forced beyond the ends of the pressing-blocks.

After the wedge G has been thus driven in, the press D is detached from the tension-rods by first forcing back the valve of the pump H, by means of the screw J, and thus allowing the water to flow back into the reservoir I, after which the press is pushed forward slightly, so as to release the tension-bars A from the lugs c.

A second wedge, G', shown enlarged at fig. 7, is then introduced between the tension-bars, and is placed in position to be driven in between the two parts of the double wedge G, to facilitate which the edges of the back ends of these are rounded off, as shown, and the wedge has a handle, K, fig. 8, screwed into it, by means of which it is inserted between such rounded ends.

After unscrewing the handle, the press D is again connected to the tension-bars, and the wedge G' is forced in between the two parts of G, thereby forcing the pressing-blocks still further asunder, and in like manner any number of other wedges may be consecutively forced in, as indicated at fig. 2, until the breaking down of the coal or other material is effected.

Having thus described the nature of our invention, and in what manner the same is to be performed, we wish it to be understood that we in no way limit ourselves to the precise arrangement of apparatus, for carrying the same into effect, as shown on the accompanying drawing, as this may be variously modified, without departing from the nature of our invention; but

What we claim, is—

1. The construction and employment of apparatus for breaking down coal, slate, stone, and other minerals, wherein two or more wedges are caused to be driven consecutively, by hydraulic or screw-power, between the surfaces of the material to be broken down, in such manner that the pressure exerted at one and the same point can thereby be increased at will, substantially as hereinbefore set forth.

2. Constructing apparatus for breaking down coal, slate, stone, and other minerals, consisting of two tension-bars A, detachable from the hydraulic press D, and acting in combination with the pressing-blocks F and wedge or wedges G, with or without the clearance-box E, substantially as and for the purposes set forth.

In testimony whereof, we have signed our names to this specification, in the presence of two subscribing witnesses, this 8th day of April, 1869.

JOHN JONES.
S. P. BIDDER, Jun.

Witnesses:
CHAS. D. ABEL,
JNO. TAYLOR.